(12) United States Patent
Suzuki et al.

(10) Patent No.: US 12,330,631 B2
(45) Date of Patent: Jun. 17, 2025

(54) PARKING ASSISTANCE METHOD AND PARKING ASSISTANCE DEVICE

(71) Applicant: Nissan Motor Co., Ltd., Yokohama (JP)

(72) Inventors: Yasuhiro Suzuki, Kanagawa (JP); Yusuke Musha, Kanagawa (JP); Ryota Yamanaka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/841,997

(22) PCT Filed: Mar. 4, 2022

(86) PCT No.: PCT/JP2022/009555
§ 371 (c)(1),
(2) Date: Aug. 27, 2024

(87) PCT Pub. No.: WO2023/166738
PCT Pub. Date: Sep. 7, 2023

(65) Prior Publication Data
US 2025/0108789 A1    Apr. 3, 2025

(51) Int. Cl.
*G08G 1/14* (2006.01)
*B60W 30/06* (2006.01)
(Continued)

(52) U.S. Cl.
CPC ............ *B60W 30/06* (2013.01); *B60W 50/14* (2013.01); *B60W 2050/0083* (2013.01); *B60W 2050/146* (2013.01); *B60W 2540/215* (2020.02)

(58) Field of Classification Search
CPC ................ B60W 30/06; B60W 50/14; B60W 2050/0083; B60W 2050/146;
(Continued)

(56) References Cited

U.S. PATENT DOCUMENTS

| 6,102,147 A | 8/2000 | Shimizu et al. |
| 9,884,646 B2 | 2/2018 | Tomozawa et al. |

(Continued)

FOREIGN PATENT DOCUMENTS

| DE | 102014202243 A1 | 8/2015 |
| EP | 3378737 A1 | 9/2018 |

(Continued)

*Primary Examiner* — Anh V La
(74) *Attorney, Agent, or Firm* — Young Basile Hanlon & MacFarlane, P.C.

(57) ABSTRACT

A parking assistance method includes: calculating a first target travel trajectory starting from a start point of an actual travel trajectory when a vehicle is parked by manual driving and reaching a target parking position; calculating a deviation range including a portion of the actual travel trajectory in which the actual travel trajectory deviates a first predetermined distance or more from the first target travel trajectory; setting a target intermediate position existing in the deviation range; when assisting the vehicle in parking at the target parking position, calculating a second target travel trajectory, that is a trajectory starting from a parking start position, the parking start position being a position of the vehicle at a time point when parking is started, passing through the target intermediate position, and reaching the target parking position; and performing parking assistance control to assist the vehicle in moving along the second target travel trajectory.

11 Claims, 5 Drawing Sheets

(51) Int. Cl.
*B60W 50/14* (2020.01)
*B60W 50/00* (2006.01)

(58) Field of Classification Search
CPC ........... B60W 2540/215; B60W 30/08; B60W 30/09; B62D 15/0285; B62D 15/028; B62D 15/027; G08G 1/16; G08G 1/168
USPC ............ 340/932.2, 933, 939, 937, 988, 990, 340/995.28, 995.25
See application file for complete search history.

(56) References Cited

U.S. PATENT DOCUMENTS

| | | | |
|---|---|---|---|
| 11,597,382 | B2 | 3/2023 | Tokuhiro |
| 2015/0088382 | A1* | 3/2015 | Obuchi ................. B60W 30/14 701/41 |
| 2016/0072329 | A1 | 3/2016 | Miller et al. |
| 2016/0075377 | A1* | 3/2016 | Tomozawa ......... B62D 15/0285 701/41 |
| 2021/0380097 | A1 | 12/2021 | Tokuhiro |
| 2022/0073101 | A1* | 3/2022 | Wang ................. B62D 15/0285 |
| 2022/0306085 | A1* | 9/2022 | Ito ........................ B60W 30/06 |
| 2022/0371579 | A1 | 11/2022 | Tokuhiro |
| 2023/0182718 | A1 | 6/2023 | Tokuhiro |

FOREIGN PATENT DOCUMENTS

| | | |
|---|---|---|
| JP | H10-287260 A | 10/1998 |
| JP | 2012-084021 A | 4/2012 |
| JP | 2016-060223 A | 4/2016 |
| JP | 2021-124898 A | 8/2021 |
| JP | 2021-191658 A | 12/2021 |

* cited by examiner

PARKING ASSISTANCE METHOD AND PARKING ASSISTANCE DEVICE

TECHNICAL FIELD

The present invention relates to a parking assistance method and a parking assistance device.

BACKGROUND

In JP 2016-60223 A described below, a parking assistance device configured to detect a position of an obstacle existing in a detection range around an own vehicle at a parking start position, generate a movement route along which the own vehicle moves from the parking start position to a parking target position while avoiding the obstacle, and assist the own vehicle in moving along the movement route is described.

SUMMARY

When a route along which a vehicle can move from a parking start position to a target parking position has a constraint (for example, an immovable obstacle or a restriction on a movable range of the vehicle), there are some cases where even when a target travel trajectory starting from the parking start position and reaching the target parking position is generated based on a relative position of the parking start position with respect to the target parking position, the vehicle cannot actually move along the target travel trajectory.

An object of the present invention is to, even when a route along which a vehicle can move from a parking start position to a target parking position has a constraint, calculate a target travel trajectory along which the vehicle can move from the parking start position to the target parking position.

According to an aspect of the present invention, there is provided a parking assistance method including: storing an actual trajectory along which when a vehicle is parked by manual driving, the vehicle moves from a start point to a target parking position, as an actual travel trajectory; calculating a first target travel trajectory, the first target travel trajectory being a trajectory calculated based on a relative position between a start point of the actual travel trajectory and the target parking position and starting from the start point and reaching the target parking position; calculating a deviation range, the deviation range being a range including a portion of the actual travel trajectory in which the actual travel trajectory deviates a first predetermined distance or more from the first target travel trajectory; setting a point existing in the deviation range as a target intermediate position; when assisting the vehicle in parking at the target parking position, calculating a second target travel trajectory, the second target travel trajectory being a trajectory starting from a parking start position, the parking start position being a position of the vehicle at a time point when parking is started, passing through the target intermediate position, and reaching the target parking position; and performing parking assistance control to assist the vehicle in moving along the second target travel trajectory.

According to an aspect of the present invention, it is possible to, even when a route along which a vehicle can move from a parking start position to a target parking position has a constraint, calculate a target travel trajectory along which the vehicle can move from the parking start position to the target parking position.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION (Configuration)

Figure 1:
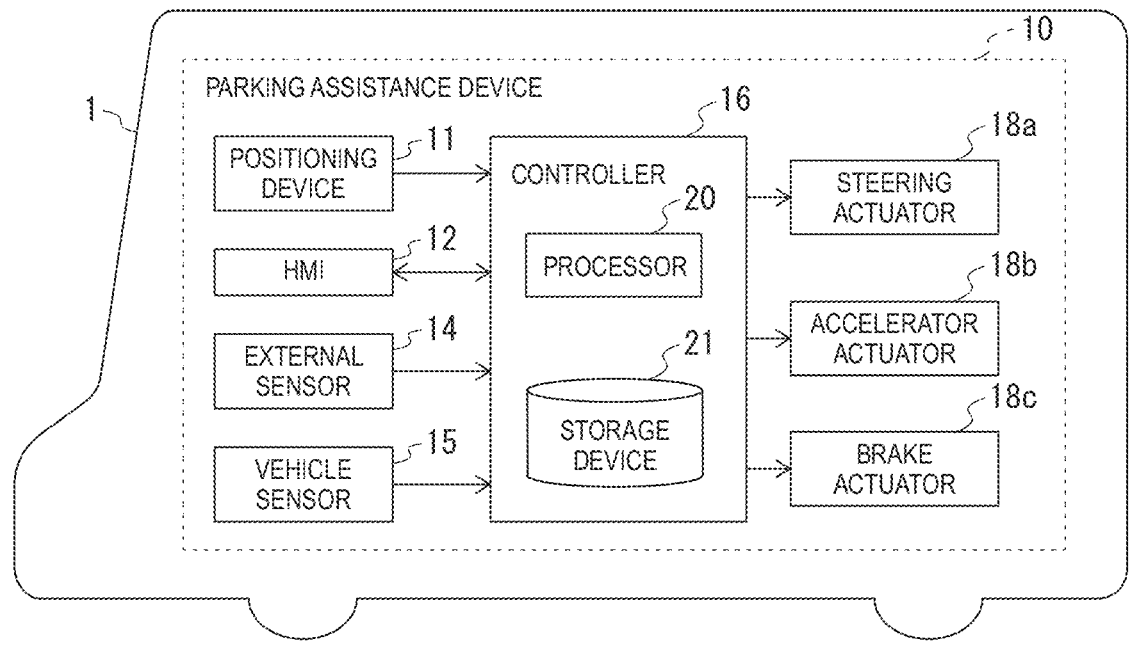
FIG. 1 is a diagram illustrative of a schematic configuration example of a parking assistance device.

FIG. 1 is now referred to. A vehicle 1 includes a parking assistance device 10 configured to assist the vehicle 1 in parking at a target parking position. The parking assistance device 10 assists the vehicle 1 in traveling along a target travel trajectory from a current position of the vehicle 1 to the target parking position. In parking assistance performed by the parking assistance device 10, various forms of assistance are included. For example, the parking assistance device 10 may perform autonomous driving to control the vehicle 1 to travel to the target parking position along the target travel trajectory of the vehicle 1. The autonomous driving to control the vehicle 1 to travel to the target parking position along the target travel trajectory of the vehicle 1 means controlling all or some of a steering angle, driving force, and braking force of the vehicle and thereby autonomously performing all or a portion of travel of the vehicle 1 along the target travel trajectory. In addition, the parking assistance device 10 may assist the vehicle 1 in parking by displaying the target travel trajectory and the current position of the vehicle 1 on a display device that a passenger of the vehicle 1 can visually recognize.

A positioning device 11 measures a current position of the vehicle 1. The positioning device 11 includes, for example, a global navigation satellite system (GNSS) receiver. The GNSS receiver may be, for example, a global positioning system (GPS) receiver or the like.

Human-machine interfaces (HMIs) 12 are interface devices that transfer information between the parking assistance device 10 and the passenger. The HMIs 12 include the display device that the passenger of the vehicle 1 can visually recognize, a speaker, a buzzer, and manipulators (a button, a switch, a lever, a dial, a touch panel, and the like).

External sensors 14 detect an object existing in a predetermined distance range from the vehicle 1. The external sensors 14 detect a surrounding environment of the vehicle 1, such as a relative position between an object existing in the surroundings of the vehicle 1 and the vehicle 1, distance between the vehicle 1 and the object, and a direction in which the object exists. The external sensors 14 may include, for example, a camera to capture an image of the surrounding environment of the vehicle 1. The camera may be, for example, an around view monitoring camera that captures images of the surroundings of the vehicle 1 and generates captured images to be converted to an overhead image (around view monitoring image). The external sensors 14 may include a ranging device, such as a sonar, a laser range finder, a radar, or a laser radar of a light detection and ranging (LiDAR).

The vehicle sensors 15 detect various information (vehicle information) of the vehicle 1. The vehicle sensors 15 include, for example, a vehicle speed sensor configured to detect travel speed of the vehicle 1, wheel speed sensors configured to detect rotational speed of respective tires that the vehicle 1 includes, a triaxial acceleration sensor (G sensor) configured to detect acceleration (including deceleration) in three axial directions of the vehicle 1, a steering angle sensor configured to detect a steering angle of a steering wheel, a turning angle sensor configured to detect a turning angle of steered wheels, a gyro sensor configured to detect angular velocity generated in the vehicle 1, and a yaw rate sensor configured to detect a yaw rate.

A controller 16 is an electronic control unit that performs parking assistance control of the vehicle 1. The controller 16 includes a processor 20 and peripheral components, such as a storage device 21. The processor 20 may be, for example, a CPU or an MPU. The storage device 21 may include a semiconductor storage device, a magnetic storage device, an optical storage device, or the like. Functions of the controller 16, which will be described below, may be achieved by, for example, the processor 20 executing computer programs stored in the storage device 21. Note that the controller 16 may be formed using dedicated hardware for performing various types of information processing that will be described below.

A steering actuator 18a controls steering direction and the amount of steering of a steering mechanism of the vehicle 1 in accordance with a control signal from the controller 16. An accelerator actuator 18b controls accelerator opening of a drive device, which is an engine or a drive motor, in accordance with a control signal from the controller 16. A brake actuator 18c causes a braking device to operate in accordance with a control signal from the controller 16.

Next, the parking assistance control performed by the parking assistance device 10 will be described. In the parking assistance control, the parking assistance device 10 calculates a relative position of a parking start position with respect to a target parking position Pt. The parking start position is a position of the vehicle 1 at a time point when the parking assistance control to the target parking position Pt is started. The parking assistance device 10 calculates, based on the relative position of the parking start position with respect to the target parking position Pt, a target travel trajectory Tt along which the vehicle 1 is caused to move from the parking start position to the target parking position Pt. The parking assistance device 10 performs the parking assistance control to assist the vehicle 1 in moving along the target travel trajectory Tt. The target travel trajectory Tt is an example of "second target travel trajectory" in the claims.

The relative position of the parking start position with respect to the target parking position Pt may be calculated by, for example, storing a feature point and a feature amount of a target object around the target parking position Pt in advance and performing calculation based on the stored feature point and feature amount and a feature point and a feature amount of a target object detected around the vehicle 1.

For example, when the vehicle 1 is to be parked at the target parking position Pt by manual driving, the parking assistance device 10 detects a feature point and a feature amount of a target object around the target parking position Pt and stores a position of the feature point with respect to the target parking position Pt and the feature amount of the feature point in the storage device 21. An operation mode in which the parking assistance device 10 stores a position of a feature point and a feature amount of a target object in the storage device 21 in this way is referred to as "target object learning mode".

On the other hand, an operation mode in which the parking assistance device 10 assists the vehicle 1 in parking at the target parking position Pt is referred to as "parking assistance mode". In the parking assistance mode, the parking assistance device 10 performs parking assistance control including: calculating a relative position of the parking start position with respect to the target parking position Pt, based on the stored feature point position and feature amount of a target object around the target parking position Pt and a position of a feature point and a feature amount of a target object detected around the vehicle 1; calculating a target travel trajectory Tt, based on the calculated relative position; and assisting the vehicle 1 in moving along the target travel trajectory Tt.

Note that the description herein is not intended to limit the technical scope of the present invention by a calculation method of a relative position of a parking start position with respect to a target parking position Pt. The present invention is widely applicable to a method for calculating a target travel trajectory from a parking start position to a target parking position Pt. That is, a relative position of a parking start position with respect to a target parking position Pt can be acquired by various methods. For example, the parking start position with respect to the target parking position Pt may be calculated by detecting a parking space line or a parking space around the vehicle 1 by the camera in the external sensors 14 and thereby detecting the target parking position Pt.

As described above, in the parking assistance mode, the parking assistance device 10 calculates a target travel trajectory Tt that is a trajectory along which the vehicle 1 is caused to move from the parking start position to the target parking position Pt. However, a route that enables a vehicle to move from a parking start position to a target parking position Pt sometimes has a constraint.

For example, in some cases, an immovable obstacle, such as a pole and a tree, exists between the parking start position and the target parking position Pt or a space in which a vehicle can move (that is, a movable range) is restricted. In such a case, even when the parking assistance device 10 generates a target travel trajectory, based on a relative position of the parking start position with respect to the target parking position Pt, the vehicle sometimes cannot move along the target travel trajectory.

In addition, when a target travel trajectory is modified to avoid the above-described obstacle or restriction while the vehicle is moving from the parking start position to the target parking position Pt, a smooth target travel trajectory sometimes cannot be generated.

Figure 2A:
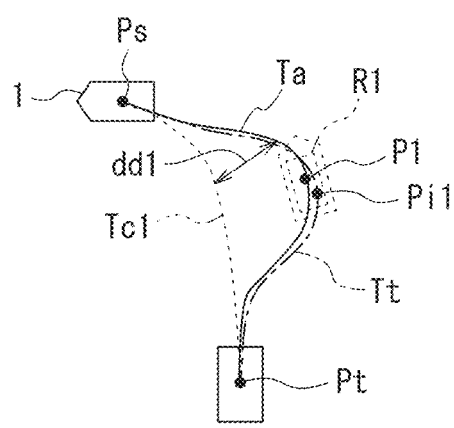
FIG. 2A is an explanatory diagram of an example of a parking assistance method of an embodiment.

Accordingly, the parking assistance device 10 of an embodiment stores an actual trajectory (hereinafter, referred to as "actual travel trajectory") along which when the vehicle 1 is parked by manual driving, the vehicle 1 moves to the target parking position Pt. FIG. 2A is now referred to. A solid line Ta indicates an actual travel trajectory along which the vehicle 1 is caused to move from a start point (start position) Ps to a target parking position Pt by manual driving.

The parking assistance device 10 sets, based on the actual travel trajectory Ta, a target intermediate position (in the example in FIG. 2A, a position Pi1) through which the vehicle 1 is caused to pass while moving from the parking start position to the target parking position Pt.

The parking assistance device 10 calculates, to set a target intermediate position, a trajectory starting from the start point Ps of the actual travel trajectory Ta and reaching the target parking position Pt, based on a relative position between the start point Ps of the actual travel trajectory Ta and the target parking position Pt. A trajectory that is calculated to set a target intermediate position is referred to as "generated trajectory". The generated trajectory is an example of "first target travel trajectory" and "third target travel trajectory" in the claims. For example, in FIG. 2A, a generated trajectory Tc1 (dashed line) is illustrated.

The parking assistance device 10 calculates a deviation range that is a range including a portion of the actual travel trajectory Ta in which the actual travel trajectory Ta deviates a first predetermined distance d1 or more from the generated trajectory. For example, in FIG. 2A, a deviation range R1 including a portion of the actual travel trajectory Ta in which the actual travel trajectory Ta deviates the first predetermined distance d1 or more from the generated trajectory Tc1 is illustrated.

Figure 2B:
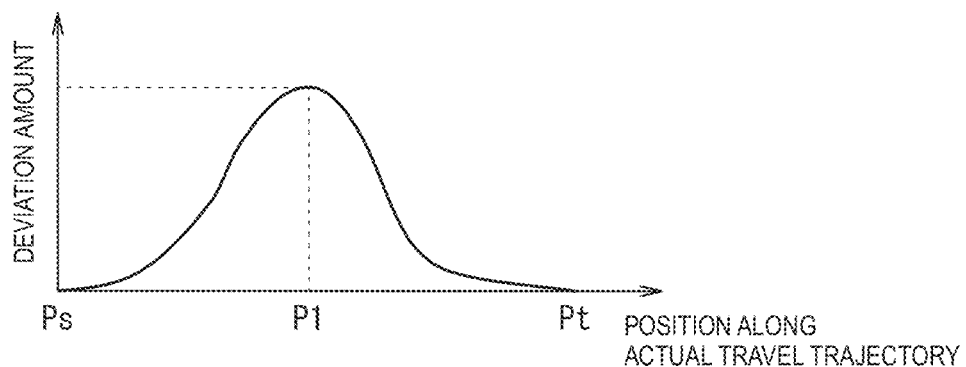
FIG. 2B is another explanatory diagram of the example of the parking assistance method of the embodiment.

In the following description, a term "deviation amount" is used to represent the amount of deviation of a generated trajectory from the actual travel trajectory Ta. For example, the deviation amount may be defined as distance between the actual travel trajectory Ta and the generated trajectory in a normal direction of the actual travel trajectory Ta. For example, in FIG. 2A, a deviation amount dd1 of the generated trajectory Tc1 from the actual travel trajectory Ta is illustrated. In addition, FIG. 2B illustrates the deviation amounts dd1 with respect to positions along the actual travel trajectory Ta. A point P1 is a point on the actual travel trajectory Ta that maximizes the deviation amount dd1.

In addition, a portion of the actual travel trajectory Ta in which the actual travel trajectory Ta deviates the first predetermined distance d1 or more from the generated trajectory is referred to as "deviation portion". For example, when the deviation amount at some point on the actual travel trajectory Ta is the first predetermined distance d1 and the deviation amount is less than the first predetermined distance d1 before and after the some point, the deviation portion is a single point on the actual travel trajectory Ta. In addition, for example, when the deviation amounts at two points on the actual travel trajectory Ta are the first predetermined distance d1 and the deviation amount is continuously greater than the first predetermined distance d1 in a section on the actual travel trajectory Ta sandwiched by the two points, the section sandwiched by the two points is a single deviation portion. Note that the first predetermined distance d1 is a distance large enough to determine that a driver of the vehicle 1 modified a trajectory to avoid an obstacle when the driver parks the vehicle 1 by manual driving and is a predetermined distance. Since a trajectory when the vehicle 1 is parked by manual driving has some degree of variation with respect to each driver, the first predetermined distance d1 can be set in advance in consideration of variation in travel trajectories with respect to each driver that is obtained through experiment, simulation, or the like.

The parking assistance device 10 may calculate a range including a portion or all of the deviation portion as the deviation range. For example, the parking assistance device 10 may calculate a single point on the actual travel trajectory Ta included in the deviation portion as the deviation range. For example, the parking assistance device 10 may calculate a point on the actual travel trajectory Ta that maximizes the deviation amount in the deviation portion having a nonzero length, as the deviation range. For example, the parking assistance device 10 may calculate the point P1 in FIG. 2A as the deviation range.

In addition, for example, the parking assistance device 10 may calculate a plurality of points on the actual travel trajectory Ta included in the deviation portion as the deviation range. For example, the parking assistance device 10 may calculate a plurality of points included in the deviation portion having a nonzero length, as the deviation range.

In addition, for example, the parking assistance device 10 may calculate a partial or entire section of the deviation portion having a nonzero length, as the deviation range.

In addition, when a plurality of deviation portions exist, the parking assistance device 10 may set a single point, a plurality of points, or a section included in any of the deviation portions, as the deviation range. For example, the parking assistance device 10 may set a single point, a plurality of points, or a section included in a deviation portion arbitrarily selected from the deviation portions, as the deviation range. The parking assistance device 10 may set a single point, a plurality of points, or a section included in a deviation portion that maximizes the deviation amount among the deviation portions, as the deviation range.

In addition, for example, the parking assistance device 10 may specify a range within a second predetermined distance d2 from such a single point, a plurality of points, or a section as the deviation range R1. The second predetermined distance d2 may be appropriately set to be shorter than the first predetermined distance d1.

The parking assistance device 10 sets a target intermediate position in the deviation range. The target intermediate position may be arbitrarily set in the deviation range. For example, in FIG. 2A, a target intermediate position Pi1 that is set in the deviation range R1 is illustrated. The target intermediate position Pi1 may be set to the same position as the point P1. That is, the target intermediate position may be set, with respect to each deviation range, to a point that is a point on the actual travel trajectory Ta within the deviation range and that maximizes the deviation from the generated trajectory.

The target intermediate position Pi1 may be set to a position different from the point P1. That is, the target intermediate position may be set, with respect to each deviation range, to a position different from a point that is a point on the actual travel trajectory Ta within the deviation range and that maximizes the deviation from the generated trajectory. In the example in FIG. 2A, the target intermediate position may be set to a point in a range within the second predetermined distance d2 from the point P1.

The parking assistance device 10 calculates a trajectory starting from the parking start position, passing through a target intermediate position (in the example in FIG. 2A, the target intermediate position Pi1), and reaching the target parking position Pt, as a target travel trajectory Tt (dashed-dotted line).

By setting a target intermediate position, based on the actual travel trajectory Ta along which the vehicle 1 actually moved from the start point Ps to the target parking position Pt by manual driving and calculating a target travel trajectory Tt starting from the parking start position, passing through the target intermediate position, and reaching the target parking position Pt in this way, the parking assistance device 10 can generate a target travel trajectory along which the vehicle 1 can travel even when a route along which the vehicle 1 can move has some constraint.

In addition, since a trajectory passing through the target intermediate position Pi1 can be generated before starting movement from the parking start position to the target parking position Pt, the parking assistance device 10 can generate a smooth target travel trajectory.

Figure 3:
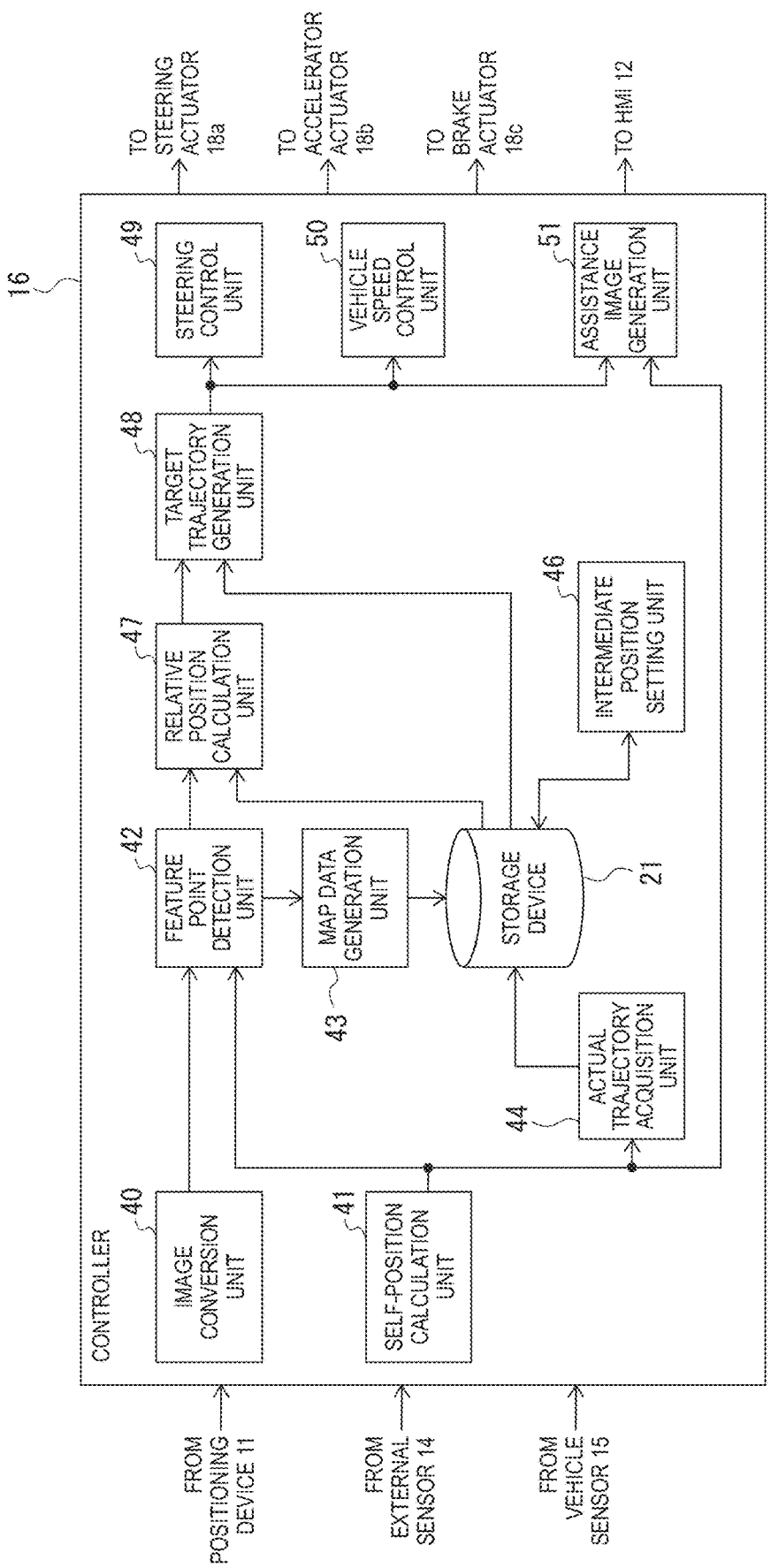
FIG. 3 is a block diagram of an example of a functional configuration of a controller in FIG. 1.

A functional configuration of the controller 16 will be described in more detail below. FIG. 3 is now referred to. The controller 16 functions as an image conversion unit 40, a self-position calculation unit 41, a feature point detection unit 42, a map data generation unit 43, an actual trajectory acquisition unit 44, an intermediate position setting unit 46, a relative position calculation unit 47, a target trajectory generation unit 48, a steering control unit 49, a vehicle speed control unit 50, and an assistance image generation unit 51.

The image conversion unit 40 converts captured images captured by the camera in the external sensors 14 to an overhead image (an around view monitoring image) that is an image viewed from a virtual viewpoint directly above the vehicle 1. Hereinafter, the overhead image after conversion by the image conversion unit 40 is sometimes referred to as "surrounding image".

The self-position calculation unit 41 calculates a current position of the vehicle 1 in the fixed coordinate system by dead reckoning or the like based on vehicle information output from the vehicle sensors 15. The fixed coordinate system is a coordinate system with the coordinate origin set at a specific point (for example, a map coordinate system). The self-position calculation unit 41 may correct the calculated current position by map mapping or the like between a target object position around the vehicle 1 detected by the external sensors 14 and a known target object position or the high-definition map information.

The feature point detection unit 42 detects a feature point of a target object around the vehicle 1 from the surrounding image output from the image conversion unit 40 and also calculates a feature amount of the feature point. The feature point in the surrounding image is a point having some feature as a target object, such as an edge point in the surrounding image, and the feature amount is information quantifying a feature of a feature point, such as luminance on an image. The position of a feature point detected from the surrounding image is represented by coordinates in a coordinate system with the current position of the vehicle 1 as a reference (hereinafter, referred to as "vehicle coordinate system"). For detection of a feature point and calculation of an image feature amount, various methods, such as SIFT, SURF, ORB, BRIAK, KAZE, and AKAZE, can be made use of. Note that timing at which the feature point detection unit 42 detects a feature point is not specifically limited, and, for example, the detection of a feature point may be constantly performed regardless of whether or not the operation mode of the parking assistance device 10 is the target object learning mode or the parking assistance mode.

Further, the feature point detection unit 42 receives the current position of the vehicle 1 from the self-position calculation unit 41. The feature point detection unit 42 generates feature point data that include a position of a detected feature point and a feature amount of the feature point and a current position of the vehicle 1 at a time point when the feature point detection unit 42 detected the feature point. The feature point detection unit 42 outputs the feature point data to the map data generation unit 43 and the relative position calculation unit 47. Note that in this configuration, the feature point detection unit 42 is only required to be able to detect at least a position of a feature point. That is, the feature point data are only required to include at least a position of a feature point and the current position of the vehicle 1 and do not necessarily have to include a detection result of the feature amount of the feature point.

When the operation mode of the parking assistance device 10 is the target object learning mode, the map data generation unit 43 stores the feature point data generated by the feature point detection unit 42 in the storage device 21. Hereinafter, a feature point stored in the storage device 21 is sometimes referred to as "learned feature point". Further, the map data generation unit 43 stores a position of the target parking position Pt in the storage device 21. For example, the current position of the vehicle 1 may be input as the target parking position Pt by a user of the vehicle 1 operating an HMI 12 when the vehicle 1 is positioned at the target parking position Pt. In addition, the current position of the vehicle 1 may be detected as the target parking position Pt when in the target object learning mode, the user changes a shift position of the vehicle 1 to a parking range or sets a parking brake. By storing a position of the learned feature point in the vehicle coordinate system, a position in the fixed coordinate system of the vehicle 1 when the learned feature point is detected, and the target parking position Pt in the fixed coordinate system in this way, the map data generation unit 43 can store a relative positional relationship between the learned feature point and the target parking position Pt.

Note that a form of storing a relative positional relationship between the learned feature point and the target parking position Pt is not limited to the above-described form and, for example, the map data generation unit 43 may store the position of the learned feature point in a relative coordinate system with the target parking position Pt as a reference.

The actual trajectory acquisition unit 44 acquires an actual travel trajectory Ta that is an actual trajectory along which the vehicle 1 moves to the target parking position Pt, while the vehicle 1 is being parked at the target parking position Pt by manual driving. For example, the actual trajectory acquisition unit 44 may acquire the actual travel trajectory Ta, based on a sequence of points representing current positions of the moving vehicle 1 by continuously receiving the current position of the vehicle 1 output from the self-position calculation unit 41 while the vehicle 1 is being parked at the target parking position Pt by manual driving.

Note that the actual trajectory acquisition unit 44 may acquire the actual travel trajectory Ta on an occasion when the vehicle 1 is parked at the target parking position Pt by manual driving to learn a feature point in the target object learning mode. Alternatively, the actual trajectory acquisition unit 44 may simply acquire the actual travel trajectory Ta without learning a feature point when the vehicle 1 is parked at the target parking position Pt by manual driving. For example, the user of the vehicle 1 may instruct start of acquisition of the actual travel trajectory Ta by operating an HMI 12.

The actual trajectory acquisition unit 44 completes the acquisition of the actual travel trajectory Ta when the actual trajectory acquisition unit 44 detects completion of the parking of the vehicle 1 by manual driving. The actual trajectory acquisition unit 44 stores the acquired actual travel trajectory Ta in the storage device 21. For example, the user of the vehicle 1 may instruct completion of the acquisition of the actual travel trajectory Ta by operating an HMI 12. In addition, the actual trajectory acquisition unit 44 may detect completion of the parking of the vehicle 1 by manual driving when the user changes the shift position of the vehicle 1 to the parking range or sets the parking brake or when the current position of the vehicle 1 reaches the target parking position Pt.

Figure 4A:
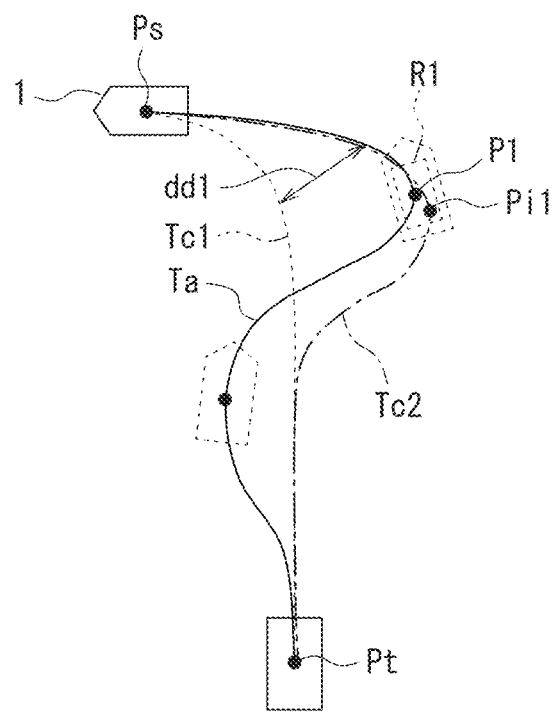
FIG. 4A is an explanatory diagram of a setting example of a target intermediate position.

When the parking of the vehicle 1 by manual driving is completed, the intermediate position setting unit 46 sets a target intermediate position, based on the actual travel trajectory Ta. FIG. 4A is now referred to. When a first target intermediate position Pi1 is to be set, the intermediate position setting unit 46 calculates a generated trajectory Tc1 starting from the start point Ps of the actual travel trajectory Ta and reaching the target parking position Pt. For example, the intermediate position setting unit 46 may calculate a clothoid curve connecting the start point Ps and the target parking position Pt as the generated trajectory Tc1. The intermediate position setting unit 46 determines whether or not a deviation portion in which the actual travel trajectory Ta deviates the first predetermined distance d1 or more from the generated trajectory Tc1 exists within the actual travel trajectory Ta. When no such deviation portion exists, the intermediate position setting unit 46 does not set a first target intermediate position Pi1. In this case, no target intermediate position is set. When a deviation portion exists, the intermediate position setting unit 46 calculates a deviation range R1 including the deviation portion. When a plurality of deviation portions exist, the intermediate position setting unit 46 calculates a deviation range R1 including one of the deviation portions. For example, the intermediate position setting unit 46 may set a deviation range R1 in such a way that the deviation range R1 includes an arbitrarily selected deviation portion or a deviation portion having a largest deviation amount among the deviation portions.

The intermediate position setting unit 46 sets a target intermediate position Pi1 in the deviation range R1. Note that when the intermediate position setting unit 46 sets a target intermediate position Pi1, the intermediate position setting unit 46 may calculate a trajectory starting from the start point Ps, passing through the target intermediate position Pi1, and reaching the target parking position Pt and determine whether or not the vehicle 1 can move on the calculated trajectory. When the intermediate position setting unit 46 determines that the vehicle 1 cannot move on the calculated trajectory, the intermediate position setting unit 46 may reset the target intermediate position Pi1 to another point in the deviation range R1. The intermediate position setting unit 46 may repeat processing of resetting a target intermediate position Pi1 in the deviation range R1 until the intermediate position setting unit 46 can calculate a trajectory on which the vehicle 1 can move.

When the intermediate position setting unit 46 sets the target intermediate position Pi1, the intermediate position setting unit 46 calculates a generated trajectory Tc2 starting from the start point Ps, passing through the target intermediate position Pi1, and reaching the target parking position Pt. The generated trajectory Tc2 is an example of "third target travel trajectory" in the claims. For example, the intermediate position setting unit 46 may calculate a generated trajectory Tc2 by connecting a clothoid curve connecting the start point Ps and the target intermediate position Pi1 and a clothoid curve connecting the target intermediate position Pi1 and the target parking position Pt. The intermediate position setting unit 46 determines whether or not a deviation portion in which the actual travel trajectory Ta deviates the first predetermined distance d1 or more from the generated trajectory Tc2 exists within the actual travel trajectory Ta. That is, the intermediate position setting unit 46 determines whether or not a deviation amount dd2 of the generated trajectory Tc2 from the actual travel trajectory Ta is less than the first predetermined distance d1 across the actual travel trajectory Ta from the start point Ps to the target parking position Pt. When no deviation portion exists, the intermediate position setting unit 46 does not set a second target intermediate position. In this case, only the target intermediate position Pi1 is set. When a deviation portion exists, the intermediate position setting unit 46 calculates a deviation range R2 including the deviation portion and sets an additional target intermediate position Pi2 in the deviation range R2. A point P2 is a point on the actual travel trajectory Ta that maximizes the deviation amount dd2.

When the intermediate position setting unit 46 has set a plurality of target intermediate positions Pi1 and Pi2, the intermediate position setting unit 46 sets order of the target intermediate positions Pi1 and Pi2 (in the following description, referred to as "intermediate position order") in descending order of distance from the target parking position Pt (that is, in ascending order of distance from the start point Ps) along the actual travel trajectory Ta. In the following description, the order set to the target intermediate positions is referred to as "intermediate position order".

Figure 4B:
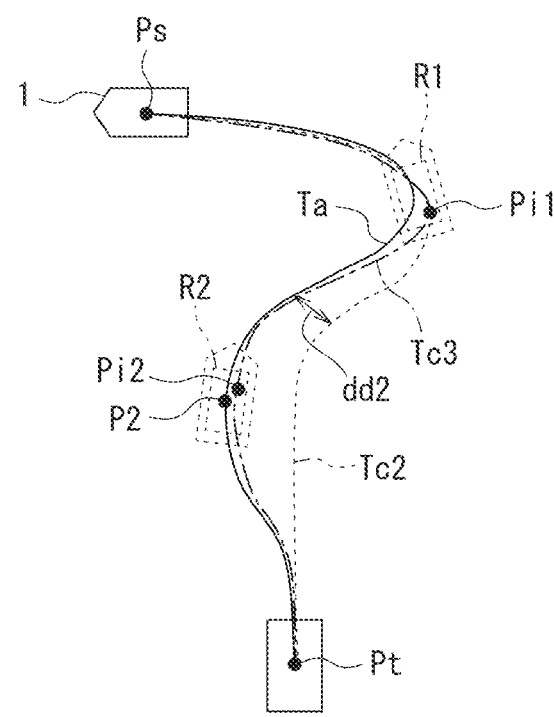
FIG. 4B is an explanatory diagram of a setting example of another target intermediate position.

The intermediate position setting unit 46 calculates a generated trajectory Tc3 starting from the start point Ps, passing through the target intermediate positions Pi1 and Pi2, and reaching the target parking position Pt. The generated trajectory Tc3 is an example of the "third target travel trajectory" in the claims. On this occasion, the intermediate position setting unit 46 calculates the generated trajectory Tc3 in such a way that the generated trajectory Tc3 passes through the target intermediate positions Pi1 and Pi2 in accordance with the intermediate position order. That is, the intermediate position setting unit 46 calculates the generated trajectory Tc3 starting from the start point Ps, passing through the target intermediate positions Pi1 and Pi2 in ascending order of distance from the start point Ps in order of positions along the actual travel trajectory Ta, and reaching the target parking position Pt. For example, in the example in FIG. 4B, the intermediate position setting unit 46 calculates a generated trajectory Tc3 that passes through the target intermediate positions Pi1 and Pi2 in this order. For example, the intermediate position setting unit 46 may calculate the generated trajectory Tc3 by connecting a clothoid curve connecting the start point Ps and the target intermediate position Pi1, a clothoid curve connecting the target intermediate position Pi1 and the target intermediate position Pi2, and a clothoid curve connecting the target intermediate position Pi2 and the target parking position Pt.

The intermediate position setting unit 46 determines whether or not a deviation portion in which the actual travel trajectory Ta deviates the first predetermined distance d1 or more from the generated trajectory Tc3 exists within the actual travel trajectory Ta. When no such deviation portion exists, the intermediate position setting unit 46 does not set a third target intermediate position. In this case, only the target intermediate positions Pi1 and Pi2 are set. When such a deviation portion exists, the intermediate position setting unit 46 adds a third target intermediate position by the same method as the method by which the second target intermediate position Pi2 is set. Subsequently, the intermediate position setting unit 46 adds a target intermediate position until the intermediate position setting unit 46 can generate a generated trajectory that does not includes a portion deviating the first predetermined distance d1 or more from the actual travel trajectory Ta. When the intermediate position setting unit 46 has generated a generated trajectory that does not includes a portion deviating the first predetermined distance d1 or more from the actual travel trajectory Ta, the intermediate position setting unit 46 completes the setting of a target intermediate position and stores the set target intermediate positions in the storage device 21.

Note that a constraint on a route that enables a vehicle to move to the target parking position Pt (for example, a constraint on a movable range or an obstacle) is sometimes a temporary constraint. In this case, a target intermediate position is sometimes unnecessary. Therefore, the intermediate position setting unit 46 may accept a selection input in which the user of the vehicle 1 selects one of the set target intermediate positions and store only the selected target intermediate position in the storage device 21.

For example, the intermediate position setting unit 46 displays a plurality of set target intermediate positions on the display device in the HMIs 12 and accepts a selection input in which the user of the vehicle 1 selects a target intermediate position required to be stored from the displayed target intermediate positions, using a manipulator in the HMIs 12. The selection input may be, for example, an input to specify a target intermediate position to be registered or an input to specify an unnecessary target intermediate position.

In addition, when, for example, N target intermediate positions are set, the intermediate position setting unit 46 may set all combinations obtained by selecting 1 to N target intermediate positions from the N target intermediate positions, display trajectories each starting from the start point Ps, passing through target intermediate positions included in one of the combinations, and reaching the target parking position Pt on the display device in the HMIs 12, and accept an input specifying one of the displayed trajectories. In this case, the intermediate position setting unit 46 may store a target intermediate position through which the specified trajectory passes, in the storage device 21.

FIG. 3 is now referred to. To start the parking assistance control to assist the vehicle 1 in parking at the target parking position Pt, the operation mode of the parking assistance device 10 is switched to the parking assistance mode. For example, the parking assistance device 10 may switch the operation mode to the parking assistance mode when the vehicle 1 is positioned in a vicinity of the target parking position Pt. On this occasion, when the shift position is changed from a drive range to a reverse range or changed from the reverse range to the drive range, the parking assistance device 10 may switch the operation mode to the parking assistance mode. In addition, the parking assistance device 10 may switch the operation mode to the parking assistance mode when a "parking assistance activation switch" that is prepared in the HMIs 12 is operated. A condition for switching the operation mode to the parking assistance mode can be arbitrarily set.

When the operation mode of the parking assistance device 10 is switched to the parking assistance mode, the relative position calculation unit 47 sets a current position of the vehicle 1 at a time point when the parking assistance control to the target parking position Pt is started, as a parking start position Pps. In addition, the relative position calculation unit 47 matches a learned feature point stored in the storage device 21 with a feature point in the feature point data output from the feature point detection unit 42 to associates the same feature points with each other. In the following description, a feature point that the feature point detection unit 42 detects in the surroundings of the vehicle 1 when the operation mode of the parking assistance device 10 is the parking assistance mode is referred to as "surrounding feature point".

The relative position calculation unit 47 calculates a relative position of the parking start position Pps with respect to the target parking position Pt, based on a relative positional relationship between a surrounding feature point and the vehicle 1 and a relative positional relationship between a learned feature point associated with the surrounding feature point and the target parking position Pt. For example, surrounding feature points are denoted by $(x_i, y_i)$, and learned feature points each of which is associated with one of the surrounding feature points $(x_i, y_i)$ are denoted by $(x_{mi}, y_{mi})$ (i=1 to N). The relative position calculation unit 47 calculates an affine transformation matrix $M_{affine}$, using the following equation, based on a least-square method.

$$\begin{bmatrix} a_1 \\ a_2 \\ a_3 \\ a_4 \end{bmatrix} = [X_X^T X_X]^{-1} X_X^T X_{tfm} \qquad \text{[Math 1]}$$

where $$X_X = \begin{bmatrix} x_{m1} & y_{m1} & 1 & 0 \\ y_{m1} & -x_{m1} & 0 & 1 \\ \vdots & \vdots & \vdots & \vdots \\ x_{mN} & y_{mN} & 1 & 0 \\ y_{mN} & -x_{mN} & 0 & 1 \end{bmatrix}$$

$$X_{tfm} = \begin{bmatrix} x_1 \\ y_1 \\ \vdots \\ x_N \\ y_N \end{bmatrix}$$

$$M_{affine} = \begin{bmatrix} a_1 & a_2 & a_3 \\ -a_2 & a_1 & a_4 \end{bmatrix}$$

The relative position calculation unit 47 may calculate a column vector $(a_1, a_2, a_3, a_4)^T$ as in the following equation, using a weighted least-square method.

$$W = \text{diag}(w_1 \ldots w_N) \qquad \text{[Math 2]}$$

$$\begin{bmatrix} a_1 \\ a_2 \\ a_3 \\ a_4 \end{bmatrix} = [X_X^T W X_X]^{-1} X_X^T W X_{tfm}$$

The relative position calculation unit 47 converts a position (targetx$_m$, targety$_m$) of the target parking position Pt in the fixed coordinate system, which is stored in the storage device 21, to a position (targetx, targety) in the vehicle coordinate system, using the following equation.

$$\left\{ \begin{matrix} \text{targetx} \\ \text{targety} \end{matrix} \right\} = M_{affine} \left\{ \begin{matrix} \text{targetx}_m \\ \text{targety}_m \\ 1 \end{matrix} \right\} \qquad \text{[Math 3]}$$

The position (targetx, targety) of the target parking position Pt in the vehicle coordinate system represents a relative position of the parking start position Pps with respect to the target parking position Pt. The relative position calculation unit 47 outputs the relative position of the parking start position Pps with respect to the target parking position Pt to the target trajectory generation unit 48.

Figure 5A:
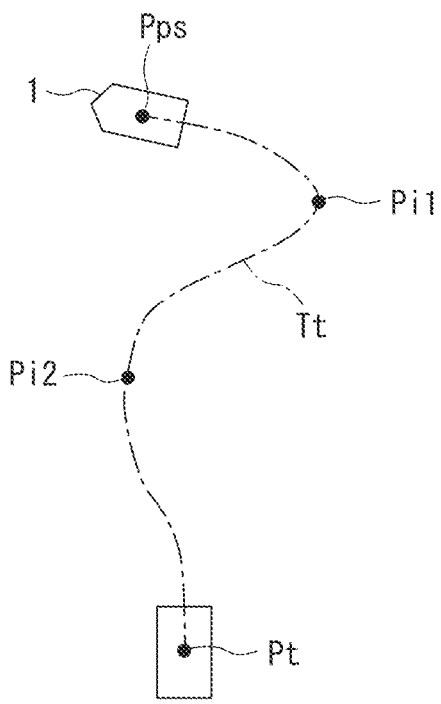
FIG. 5A is an explanatory diagram of a calculation example of a target travel trajectory.

The target trajectory generation unit 48 calculates a target travel trajectory Tt, based on the relative position of the parking start position Pps with respect to the target parking position Pt and a target intermediate position. FIG. 5A is now referred to. The target trajectory generation unit 48 calculates the target travel trajectory Tt in such a way that the target travel trajectory Tt passes through the target intermediate positions Pi1 and Pi2 in accordance with the intermediate position order. That is, the target trajectory generation unit 48 calculates the target travel trajectory Tt starting from the parking start position Pps, passing through the target intermediate positions Pi1 and Pi2 in accordance with the intermediate position order (that is, passing through the target intermediate positions Pi1 and Pi2 in descending order of distance from the target parking position Pt in order of positions along the actual travel trajectory Ta), and reaching the target parking position Pt. To calculation of the target travel trajectory Tt, a well-known method that is employed for an automated parking device can be applied. For example, the target travel trajectory Tt can be calculated by connecting the parking start position Pps and the target parking position Pt via the target intermediate positions Pi1 and Pi2 by clothoid curves.

Figure 5B:
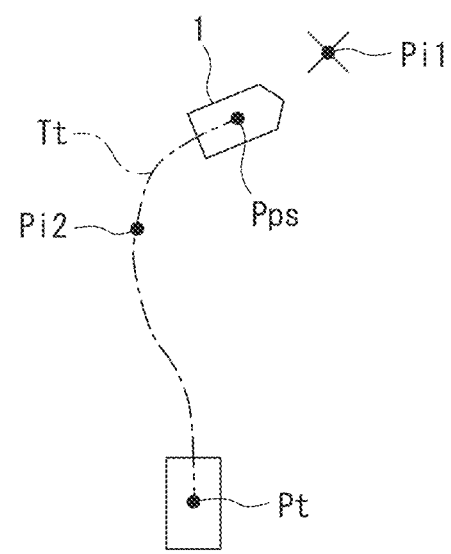
FIG. 5B is an explanatory diagram of a calculation example of another target travel trajectory.

FIG. 5B is now referred to. In some cases, no target travel trajectory Tt that passes through all the target intermediate positions Pi1 and Pi2 stored in the storage device 21 can be calculated. For example, when the parking start position Pps is closer to the target parking position Pt than a target intermediate position (in the example in FIG. 5B, the target intermediate position Pi1), no target travel trajectory Tt that passes through the target intermediate position can be calculated. Such a situation may occur when, for example, the driver performs parking to a halfway point by manual driving and the parking assistance control is started at a position closer to the target parking position Pt than the start point Ps of the actual travel trajectory Ta.

In this case, the target trajectory generation unit 48 successively removes target intermediate positions among the target intermediate positions Pi1 and Pi2 retrieved from the storage device 21, in accordance with the intermediate position order (that is, in descending order of distance from the target parking position Pt along the actual travel trajectory Ta) and calculates a target travel trajectory Tt starting from the parking start position Pps, passing through a target intermediate position that is not removed, and reaching the target parking position Pt. In the example in FIG. 5B, with the exception of the target intermediate position Pi1, a target travel trajectory Tt starting from the parking start position Pps, passing through the target intermediate position Pi2, and reaching the target parking position Pt is calculated.

Further, the target trajectory generation unit 48 calculates a target vehicle speed profile that indicates vehicle speed at which the vehicle 1 travels along the target travel trajectory Tt. For example, the target vehicle speed profile may be a vehicle speed profile that causes the vehicle 1 to accelerate to a predetermined set speed from the parking start position Pps and subsequently decelerate before the target parking position Pt and come to a stop at the target parking position Pt. The set speed may be set based on curvature of the calculated target travel trajectory in such a manner that the larger the curvature is, the lower the speed becomes.

FIG. 3 is now referred to. The target trajectory generation unit 48 outputs the target travel trajectory Tt and the target vehicle speed profile to the steering control unit 49 and the vehicle speed control unit 50, respectively.

The steering control unit 49 controls the steering actuator 18a in such a way that the vehicle 1 travels along the target travel trajectory Tt. The vehicle speed control unit 50 controls the accelerator actuator 18b and the brake actuator 18c in such a way that vehicle speed of the vehicle 1 changes in accordance with the target vehicle speed profile. Because of this configuration, the vehicle 1 is controlled to travel along the target travel trajectory Tt. The assistance image generation unit 51 generates a parking assistance image that represents the target travel trajectory Tt and the current position of the vehicle 1. For example, the parking assistance image may be an image obtained by superimposing the target travel trajectory Tt and the current position of the vehicle 1 on a bird's eye image or an overhead image in which the surroundings of the vehicle 1 is viewed from above. The assistance image generation unit 51 displays the parking assistance image on the display device in the HMIs 12.

(Operation)

Figure 6:
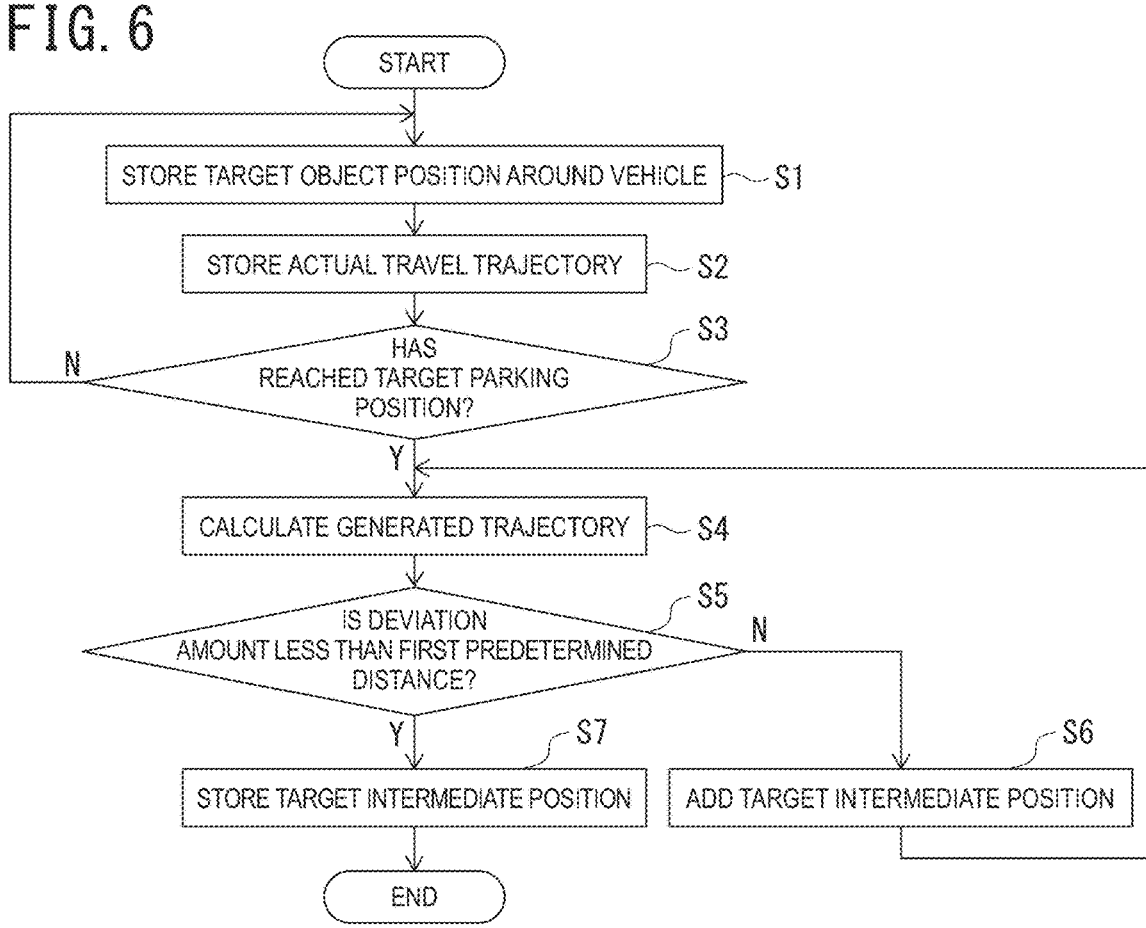
FIG. 6 is a flowchart of an example of processing performed when parking by manual driving is performed.

FIG. 6 is a flowchart of an example of processing performed when parking by manual driving is performed. In step S1, the feature point detection unit 42 stores a feature point of a target object around the vehicle 1 in the storage device 21 as a learned feature point. In step S2, the actual trajectory acquisition unit 44 acquires an actual travel trajectory Ta and stores the acquired actual travel trajectory Ta in the storage device 21. In step S3, the parking assistance device 10 determines whether or not the vehicle 1 has reached a target parking position Pt. When the vehicle 1 has not reached the target parking position Pt (step S3: N), the process returns to step S1. When the vehicle 1 has reached the target parking position Pt (step S3: Y), the process proceeds to step S4.

In step S4, the intermediate position setting unit 46 calculates a generated trajectory. In step S5, the intermediate position setting unit 46 determines whether or not a deviation amount of the generated trajectory from the actual travel trajectory Ta is less than a first predetermined distance d1 across the actual travel trajectory Ta from a start point Ps of the actual travel trajectory Ta to the target parking position Pt. When the deviation amount is not less than the first predetermined distance d1 (step S5: N), the process proceeds to step S6. When the deviation amount is less than the first predetermined distance d1 (step S5: Y), the process proceeds to step S7. In step S6, the intermediate position setting unit 46 sets a target intermediate position in a deviation range. When step S6 is performed twice or more in the processing loop from step S4 to step S6, an additional target intermediate position is set on and after the second performance of step S6. Subsequently, the process returns to step S4. In step S7, the intermediate position setting unit 46 stores the set target intermediate position in the storage device 21. Subsequently, the process terminates.

Figure 7:
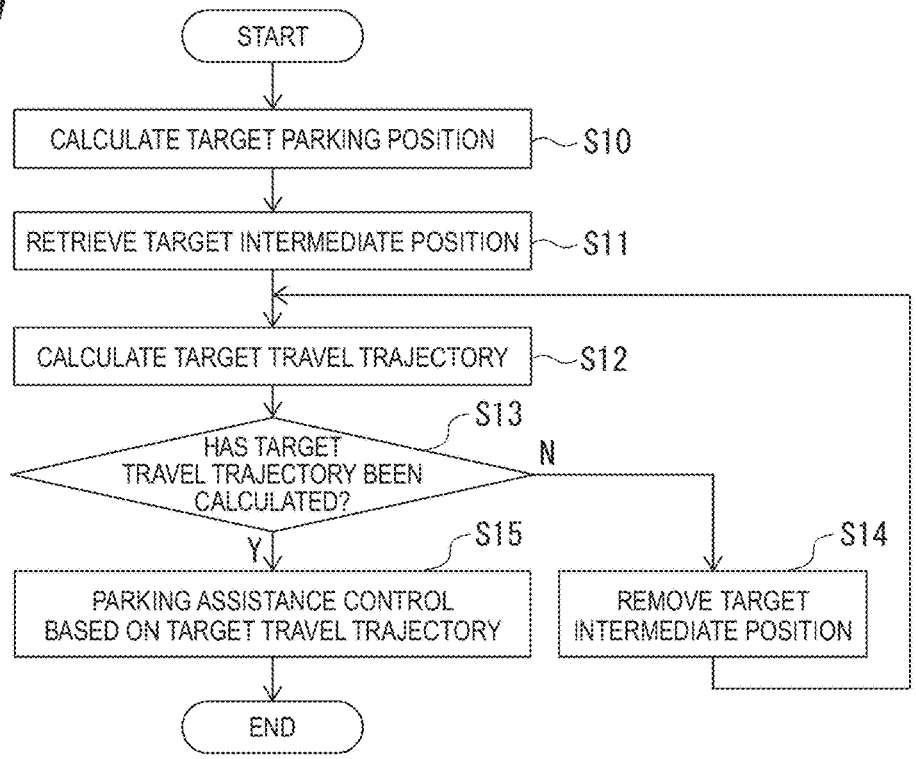
FIG. 7 is a flowchart of an example of processing when parking assistance is performed.

FIG. 7 is a flowchart of an example of processing when the parking assistance is performed. In step S10, the relative position calculation unit 47 calculates a relative position of the target parking position Pt with respect to a parking start position Pps that is a current position of the vehicle 1 at a time point when the parking assistance control is started. That is, the relative position calculation unit 47 calculates a relative position of the parking start position Pps with respect to the target parking position Pt. In step S11, the target trajectory generation unit 48 retrieves a target intermediate position from the storage device 21. In step S12, the target trajectory generation unit 48 attempts to calculate a target travel trajectory Tt starting from the parking start position Pps, passing through the retrieved target intermediate position, and reaching the target parking position Pt.

In step S13, the target trajectory generation unit 48 determines whether or not the target trajectory generation unit 48 has been able to calculate a target travel trajectory Tt. When the target trajectory generation unit 48 has not been able to calculate a target travel trajectory Tt (step S13: N), the process proceeds to step S14. When the target trajectory generation unit 48 has been able to calculate a target travel trajectory Tt (step S13: Y), the process proceeds to step S15.

In step S14, the target trajectory generation unit 48 removes a target intermediate position among target intermediate positions that is the farthest from the target parking position Pt along the actual travel trajectory Ta. Subsequently, the process returns to step S12.

In step S15, the target trajectory generation unit 48 calculates a target vehicle speed profile that indicates vehicle speed at which the vehicle 1 travels along the target travel trajectory Tt. The steering control unit 49 controls the steering actuator 18a in such a way that the vehicle 1 travels along the target travel trajectory Tt. The vehicle speed control unit 50 controls the accelerator actuator 18b and the brake actuator 18c in such a way that vehicle speed of the vehicle 1 changes in accordance with the target vehicle speed profile. When the vehicle 1 reaches the target parking position Pt, the process terminates.

Advantageous Effects of Embodiment (1) The controller 16: stores an actual trajectory along which when a vehicle 1 is parked by manual driving, the vehicle 1 moves to a target parking position Pt, as an actual travel trajectory Ta; calculates a first target travel trajectory, the first target travel trajectory being a trajectory starting from a start point Ps of the actual travel trajectory Ta and reaching the target parking position Pt, based on a relative position between the start point Ps of the actual travel trajectory Ta and the target parking position Pt; calculates a deviation range, the deviation range being a range including a portion of the actual travel trajectory Ta in which the actual travel trajectory Ta deviates a first predetermined distance or more from the first target travel trajectory; sets a point existing in the deviation range as a target intermediate position; when assisting the vehicle 1 in parking at the target parking position Pt, calculates a second target travel trajectory, the second target travel trajectory being a trajectory starting from a parking start position Pps, the parking start position Pps being a position of the vehicle 1 at a time point when parking is started, passing through the target intermediate position, and reaching the target parking position Pt; and performs parking assistance control to assist the vehicle 1 in moving along the second target travel trajectory. By setting a target intermediate position, based on the actual travel trajectory Ta and calculating a target travel trajectory starting from the parking start position, passing through the target intermediate position, and reaching the target parking position Pt in this way, a target travel trajectory along which the vehicle can travel can be calculated even when a route along which the vehicle can move has a constraint. In addition, since a trajectory passing through the target intermediate position can be generated before the vehicle starts movement from the parking start position Pps to the target parking position Pt, a smooth target travel trajectory can be generated.

(2) The controller 16 may set, with respect to each of the deviation ranges, a point within a range of a second predetermined distance from a point, the point being a point on the actual travel trajectory Ta in the deviation range and having a longest distance from the first target travel trajectory, as the target intermediate position.

It can be estimated that a point at which the first target travel trajectory calculated by the controller 16 and the actual travel trajectory Ta deviate most from each other is a point influenced by a constraint on a route along which the vehicle 1 can move. By calculating a trajectory passing through a target intermediate position set in a vicinity of such a point, a target travel trajectory satisfying a constraint on a movable route can be calculated.

(3) The controller 16 may: (a1) calculate a trajectory starting from the start point Ps, passing through the target intermediate position, and reaching the target parking position Pt; (b1) determine whether or not the vehicle 1 can move on the calculated trajectory; and (c1) when determining that the vehicle 1 cannot move on the calculated trajectory, reset the target intermediate position to another point in the deviation range. The controller 16 may repeat the steps (a1) to (c1) until the controller 16 determines in the step (b1) that the vehicle 1 can move on the calculated trajectory. Because of this configuration, a second target travel trajectory can be calculated in such a way that the vehicle 1 can actually move.

(4) The controller 16 may: (a2) calculate a third target travel trajectory, the third target travel trajectory being a trajectory starting from the start point Ps, passing through the target intermediate position, and reaching the target parking position Pt; (b2) determine whether or not a deviation amount of the third target travel trajectory from the actual travel trajectory Ta is less than the first predetermined distance across a range from the start point Ps to the target parking position Pt; and (c2) when the deviation amount is not less than the first predetermined distance across a range from the start point Ps to the target parking position Pt, set an additional target intermediate position in a deviation range including a portion of the actual travel trajectory Ta deviating a first predetermined distance or more from the third target travel trajectory. The controller 16 may repeat the steps (a2) to (c2) until the controller 16 determines in the step (b2) that the deviation amount is less than the first predetermined distance across a range from the start point Ps to the target parking position Pt.

Because of this configuration, a second target travel trajectory can be calculated in such a way that the deviation amount from the actual travel trajectory Ta is less than the first predetermined distance.

(5) The controller 16 may avoid setting of an unnecessary target intermediate position by accepting a selection input in which a user of the vehicle 1 selects one of a plurality of the set target intermediate positions and calculating the second target travel trajectory starting from the parking start position Pps, passing through the target intermediate position selected by the user, and reaching the target parking position Pt.

(6) When the controller 16 cannot calculate the second target travel trajectory starting from the parking start position Pps, passing through a plurality of target intermediate positions, and reaching the target parking position Pt, the controller 16 may remove the target intermediate position in descending order of distance from the target parking position Pt along the actual travel trajectory Ta and calculate the second target travel trajectory starting from the parking start position Pps, passing through the target intermediate position not having been removed among the plurality of target intermediate positions, and reaching the target parking position Pt. Because of this configuration, even when the parking assistance control is started from a vicinity of a point halfway along the actual travel trajectory Ta, a second target travel trajectory reaching the target parking position Pt can be calculated.

(7) The controller 16 may control the vehicle 1 in such a way that the vehicle 1 moves along the second target travel trajectory from the parking start position Pps to the target parking position Pt and may display the second target travel trajectory and a position of the vehicle 1 on a display device, the display device being visually recognizable by a user of the vehicle 1. Because of this configuration, parking of the vehicle 1 can be assisted.

(8) The controller 16 may calculate the second target travel trajectory by connecting the parking start position Pps and the target intermediate position to each other and the target intermediate position and the target parking position Pt to each other each by a clothoid curve. Because of this configuration, a smooth second target travel trajectory can be calculated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Vehicle
10 Parking assistance device
11 Positioning device
12 Human-machine interface
14 External sensor
15 Vehicle sensor
16 Controller
18a Steering actuator
18b Accelerator actuator
18c Brake actuator
20 Processor
21 Storage device
40 Image conversion unit
41 Self-position calculation unit
42 Feature point detection unit
43 Map data generation unit
44 Actual trajectory acquisition unit
46 Intermediate position setting unit
47 Relative position calculation unit
48 Target trajectory generation unit
49 Steering control unit
50 Vehicle speed control unit
51 Assistance image generation unit

The invention claimed is:

1. A parking assistance method comprising:
storing an actual trajectory along which when a vehicle is parked by manual driving, the vehicle moves from a start point to a target parking position, as an actual travel trajectory;
calculating a first target travel trajectory, the first target travel trajectory being a trajectory calculated based on a relative position between a start point of the actual travel trajectory and the target parking position and starting from the start point and reaching the target parking position;
calculating a deviation range, the deviation range being a range including a portion of the actual travel trajectory in which the actual travel trajectory deviates a first predetermined distance or more from the first target travel trajectory;
setting a point existing in the deviation range as a target intermediate position;
when assisting the vehicle in parking at the target parking position, calculating a second target travel trajectory, the second target travel trajectory being a trajectory starting from a parking start position, the parking start position being a position of the vehicle at a time point when parking is started, passing through the target intermediate position, and reaching the target parking position; and
autonomously performing parking assistance control using autonomous driving to assist the vehicle in moving along the second target travel trajectory.

2. The parking assistance method according to claim 1, further comprising:
setting, with respect to each deviation range, a point within a range of a second predetermined distance from a point, the point being a point on the actual travel trajectory within the deviation range and having a longest distance from the first target travel trajectory, as the target intermediate position.

3. The parking assistance method according to claim 1 comprising:
(a1) calculating a trajectory starting from the start point, passing through the target intermediate position, and reaching the target parking position;
(b1) determining whether or not the vehicle can move on the calculated trajectory;
(c1) when determining that the vehicle cannot move on the calculated trajectory, resetting the target intermediate position to another point in the deviation range; and
repeating steps (a1) to (c1) until it is determined in step (b1) that the vehicle can move on the calculated trajectory.

4. The parking assistance method according to claim 1 comprising:
(a2) calculating a third target travel trajectory, the third target travel trajectory being a trajectory starting from the start point, passing through the target intermediate position, and reaching the target parking position;
(b2) determining whether or not a deviation amount of the third target travel trajectory from the actual travel trajectory is less than the first predetermined distance across a range from the start point to the target parking position;
(c2) when the deviation amount is not less than the first predetermined distance across a range from the start point to the target parking position, setting an additional target intermediate position in a deviation range including a portion of the actual travel trajectory deviating a first predetermined distance or more from the third target travel trajectory; and
repeating steps (a2) to (c2) until it is determined in step (b2) that the deviation amount is less than the first predetermined distance across a range from the start point to the target parking position.

5. The parking assistance method according to claim 1 comprising:

setting a plurality of target intermediate positions in the deviation range;

accepting a selection input in which a user of the vehicle selects any of the plurality of the target intermediate positions; and calculating the second target travel trajectory starting from the parking start position, passing through the target intermediate position selected by the user, and reaching the target parking position.

6. The parking assistance method according to claim 1 comprising:

setting a plurality of target intermediate positions in the deviation range; and when the second target travel trajectory starting from the parking start position, passing through the plurality of the target intermediate positions, and reaching the target parking position cannot be calculated, removing the target intermediate position in descending order of distance from the target parking position along the actual travel trajectory and calculating the second target travel trajectory starting from the parking start position, passing through the target intermediate position not having been removed among the plurality of the target intermediate positions, and reaching the target parking position.

7. The parking assistance method according to claim 1, further comprising:

controlling the vehicle in such a way that the vehicle moves along the second target travel trajectory from the parking start position to the target parking position.

8. The parking assistance method according to claim 1, further comprising:

displaying the second target travel trajectory and a position of the vehicle on a display device, the display device being visually recognizable by a user of the vehicle.

9. The parking assistance method according to claim 1, further comprising:

calculating the second target travel trajectory by connecting the parking start position and the target intermediate position to each other and the target intermediate position and the target parking position to each other each by a clothoid curve.

10. A parking assistance device comprising a controller configured to perform processing comprising:

storing an actual trajectory along which when a vehicle is parked by manual driving, the vehicle moves from a start point to a target parking position, as an actual travel trajectory;

calculating a first target travel trajectory, the first target travel trajectory being a trajectory calculated based on a relative position between a start point of the actual travel trajectory and the target parking position and starting from the start point and reaching the target parking position;

calculating a deviation range, the deviation range being a range including a portion of the actual travel trajectory in which the actual travel trajectory deviates a first predetermined distance or more from the first target travel trajectory;

setting a point existing in the deviation range as a target intermediate position;

when assisting the vehicle in parking at the target parking position, calculating a second target travel trajectory, the second target travel trajectory being a trajectory starting from a parking start position, the parking start position being a position of the vehicle at a time point when parking is started, passing through the target intermediate position, and reaching the target parking position; and performing parking assistance control to assist the vehicle in moving along the second target travel trajectory.

11. A parking assistance method comprising:

storing an actual trajectory along which when a vehicle is parked by manual driving, the vehicle moves from a start point to a target parking position, as an actual travel trajectory;

calculating a first target travel trajectory, the first target travel trajectory being a trajectory calculated based on a relative position between a start point of the actual travel trajectory and the target parking position and starting from the start point and reaching the target parking position;

calculating a deviation range, the deviation range being a range including a portion of the actual travel trajectory in which the actual travel trajectory deviates a first predetermined distance or more from the first target travel trajectory;

setting a point existing in the deviation range as a target intermediate position;

when assisting the vehicle in parking at the target parking position, calculating a second target travel trajectory, the second target travel trajectory being a trajectory starting from a parking start position, the parking start position being a position of the vehicle at a time point when parking is started, passing through the target intermediate position, and reaching the target parking position;

performing parking assistance control to assist the vehicle in moving along the second target travel trajectory; and displaying the second target travel trajectory and a position of the vehicle on a display device, the display device being visually recognizable by a user of the vehicle.

* * * * *